(12) United States Patent  
Filho (10) Patent No.: US 9,102,403 B2  
(45) Date of Patent: Aug. 11, 2015

(54) EMERGENCY GRAVITY FREE-FALL DEPLOYMENT SYSTEMS FOR RETRACTABLE AIRCRAFT LANDING GEAR ASSEMBLIES

(71) Applicant: EMBRAER S.A., São José dos Campos/SP (BR)

(72) Inventor: Carlos Rogulski Filho, São José dos Campos/SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 65 days.

(21) Appl. No.: 14/094,009

(22) Filed: Dec. 2, 2013

(65) Prior Publication Data

US 2015/0151832 A1 Jun. 4, 2015

(51) Int. Cl.
*B64C 25/20* (2006.01)
*B64C 25/30* (2006.01)
*B64C 25/22* (2006.01)

(52) U.S. Cl.
CPC ............... *B64C 25/30* (2013.01); *B64C 25/20* (2013.01); *B64C 25/22* (2013.01)

(58) Field of Classification Search
CPC ........ B64C 25/20; B64C 25/22; B64C 25/24; B64C 25/26; B64C 25/28; B64C 25/30
See application file for complete search history.

(56) References Cited

U.S. PATENT DOCUMENTS 2,661,171 A * 12/1953 Allen .................. 244/102 SL
2011/0024557 A1 * 2/2011 Brighton et al. ........ 244/102 SL

\* cited by examiner

*Primary Examiner* — Brian M O'Hara
(74) *Attorney, Agent, or Firm* — Nixon & Vanderhye P.C.

(57) ABSTRACT

Systems are disclosed to allow for the landing gear doors to be opened in the event of an emergency gravity free-fall landing gear deployment with little or no contact with the landing gear tires. The emergency gear extension systems according to the embodiments disclosed herein thus permit the free-fall movement of the landing gear to be synchronized with the opening of the associated gear doors. That is, according to the embodiments disclosed herein deployment of the landing gear assembly is time-delayed relative to the opening of the associated gear door(s). In such a manner, the landing gear assembly is synchronously released only after the associated gear door is in a safe position during its opening sequence thereby avoiding the risk that the gear door will jam the full extension of the landing gear during an emergency gear deployment due to contact between the landing gear tires and the gear door.

13 Claims, 6 Drawing Sheets

EMERGENCY GRAVITY FREE-FALL DEPLOYMENT SYSTEMS FOR RETRACTABLE AIRCRAFT LANDING GEAR ASSEMBLIES

FIELD

The embodiments disclosed herein relate generally to systems for the emergency deployment of retractable aircraft landing gear assemblies.

BACKGROUND

Aircraft with retractable landing gear must provide a dedicated system as a back-up to the aircraft's normal on-board landing gear retraction/extension system which will allow the aircraft's landing gear to be extended in an emergency situation (e.g., a situation in which the landing gear fails to be deployed into an extended condition by the normal on-board gear extension system due to a component failure). In general, all emergency back-up gear extension systems should be both simple to operate and completely segregated from the normal on-board landing gear actuation systems.

There are several types of emergency back-up gear extension systems that are conventionally available for aircraft, including for example, electrically actuated systems, hydraulically actuated systems, spring actuation mechanisms, and energy transmission systems whereby the energy to release the landing gear is provided only by the pilot.

Another type of emergency landing gear deployment systems includes those that rely on gravity free-fall of the landing gear assemblies. For example, in those aircraft with relatively heavy landing gear assemblies (including for example the landing gear struts and associated structural components as well as the landing wheel assemblies), emergency landing gear deployment systems have been developed which allow the landing gear to essentially "free fall" under the influence of gravity from their retracted and up-locked position to an extended and down-locked position. However a free-fall emergency landing gear actuation system becomes more complex when landing gear doors have dedicated door actuators. In such a case, during normal operation, the selector valve for the gear position controls the gear door opening and closing separately from the landing gear extension. However, in a free fall operation, the gear door valve is in an off condition and thus the gear doors are not allowed to free-fall along with the landing gear assembly. Instead, the gear doors are forced open by contact with the gear assemblies when in free-fall. In order to ensure that the gear doors do not jam the emergency extension of the free-falling landing gear, some additional structure and/or device is typically necessary to allow the gear to open in an emergency gear deployment situation. For this reason, gear doors associated with conventional free-fall emergency gear deployment systems may be provided with low friction skid plates or other means by which contact with the landing gear tires during free-fall gravity extension of the landing gear will forcibly move the gear doors to an opened state yet minimize the possibility that the doors will jam the gear extension sequence.

In some cases, however, the additional structure and/or devices to ensure gear door opening during landing gear free-fall are not effective, for example, in those situations where the kinematics of the gear door do not have harmonic movement in the same direction as the associated landing gear. In such a situation, there is a real risk that the landing gear will become jammed with its associated gear door—an event that is of course unacceptable. The design of the gear doors is thus usually sacrificed in order to create the required harmonic movement with the associated landing gear in an effort to eliminate the risk of the doors jamming the landing gear movement during emergency free-fall extension.

What has been needed in this art, therefore, are emergency gear actuation systems for aircraft landing gear which allows the landing gear doors to be opened with little or no physical interference with the associated landing gear assembly during emergency gravity free-fall landing gear deployment. It is toward providing such a need that the embodiments of the present invention are directed.

SUMMARY

In general, the invention as embodied in the systems described herein allow for the landing gear doors to be opened in the event of an emergency gravity free-fall landing gear deployment with substantially no contact with the landing gear tires (i.e., with no or at most only minimal contact between the landing gear tires and the gear door at a moment in the gear door opening sequence which is kinematically favorable). The emergency gear extension systems according to the embodiments disclosed herein thus permit the free-fall movement of the landing gear to be synchronized with the opening of the associated gear doors. That is, according to the embodiments disclosed herein the landing gear is synchronously released only after the associated gear door is in a safe position during its opening sequence thereby avoiding the risk that the gear door will jam the full extension of the landing gear during an emergency gear deployment due to contact between the landing gear tires and the gear door.

According to an embodiment of the invention, therefore, an emergency gravity free-fall landing gear deployment system for aircraft having a landing gear assembly moveable between retracted and extended positions and a landing gear door having a closed condition when the landing gear assembly is in the retracted position and movable into an opened condition to allow the landing gear assembly to be moved into the extended position. Such a system will include a landing gear uplock mechanism which includes an uplock actuator having a preset deadstroke limit. Movement of the uplock actuator within the range of the deadstroke will thereby prevent the landing gear uplock mechanism from physically unlocking the landing gear assembly, while movement of the uplock actuator beyond the deadstroke limit unlocks the landing gear uplock mechanism from the landing gear assembly.

According to such embodiments, a free-fall landing gear synchronization system will thus be operatively connected to the landing gear uplock mechanism and the landing gear door. The synchronization system will include first and second operational sequences whereby the second operational sequence is time-delayed relative to the first operational sequence. During the first operational sequence the uplock actuator is moved within the deadstroke range while simultaneously the gear door is allowed to gravity free-fall from the closed condition toward the open condition thereof, and during the second operational sequence the uplock actuator is moved beyond the deadstroke limit to allow the landing gear assembly to gravity free-fall from the retracted position to the extended position thereof. These first and second operational sequences of the free-fall landing gear synchronization system thereby allow the gear door to be moved by gravity free-fall toward the open condition thereof in advance of movement by gravity free-fall of the landing gear toward the extended position thereof According to some embodiments, the landing gear deployment system will include a pilot-initiated system actuator (e.g., a manually operated actuation lever) and a force-transmission cable assembly operatively interconnecting the system actuator and the uplock actuator. The operation of the system actuator will thereby initiate the first operational sequence of the free-fall landing gear synchronization system.

A hydraulic control system may be provided which is operable to permit gravity free-fall of the landing gear assembly and the landing gear door. The force-transmission cable assembly may thus further operatively interconnect the system actuator and the hydraulic control system such that operation of the system actuator hydraulically disconnects the hydraulic control system with the landing gear assembly and the landing gear door to permit gravity free-fall thereof.

The free-fall landing gear synchronization system may be provided according to certain embodiments with a cam actuator operatively interacting with the force transmission cable assembly and moveable between an inoperative state and an operative state. A linkage rod interconnecting the cam actuator and the landing gear door is present in certain embodiments to cause the cam actuator to move respectively from the inoperative state to the operative state thereof in response to movement of the landing gear door from a closed condition to an open condition thereof. In such a manner, therefore, movement of the cam actuator to the operative position thereof initiates the second operational sequence of the free-fall landing gear synchronization system (i.e., whereby the landing gear uplock mechanism is moved beyond the deadstroke limit to permit the landing gear assembly to gravity free-fall into its extended condition).

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
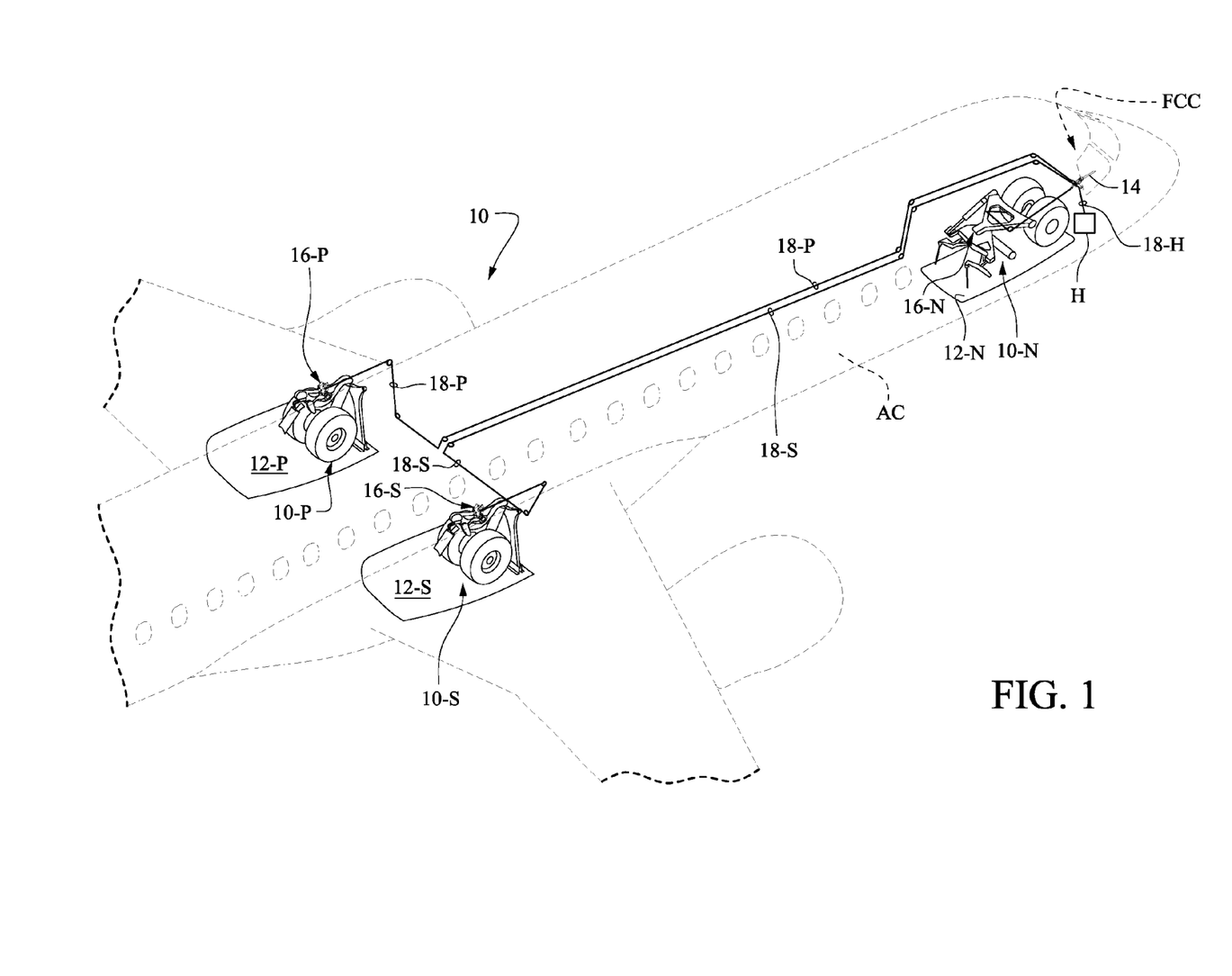
FIG. 1 is a perspective view of an embodiment of an emergency aircraft landing gear deployment system according to the invention.

Accompanying FIG. 1 depicts the layout of an emergency aircraft landing gear deployment system 10 according to an embodiment of the invention installed in a transport category aircraft AC. In this regard, the aircraft AC will include conventional port and starboard main landing gear assemblies and a nose landing gear assembly identified by reference numerals 10-P, 10-S and 10-N, respectively. As is conventional, when each of the assemblies 10-P, 10-S and 10-N is in a retracted (i.e., flight) condition, the fuselage wells into which the assemblies retract will be closed by one (or more) gear doors 12-P, 12-S and 12-N, respectively, so as to minimize aerodynamic drag during flight of the aircraft associated with the landing gear assemblies 10-P, 10-S and 10-N and their associated fuselage wells.

The system 10 includes a pilot-actuated emergency gear deployment lever 14 positioned in the forward crew cockpit FCC of the aircraft AC. The lever is operatively connected to a hydraulic control system H associated with the aircraft landing gear system and to the respective landing gear free-fall synchronizing assemblies 16-P, 16-S and 16-N associated with the port and starboard main landing gear assemblies and the nose landing gear assembly 10-P, 10-S and 10-N, respectively. Operative interconnection between the lever 14 and the hydraulic control system H on the one hand and the free-fall synchronizing assemblies 16-P, 16-S and 16-N on the other hand is provided by means of force transmission cables 18-P, 18-S, 18-N and 18-H, respectively. As will be explained in greater detail below, manual pivotal movement of the actuation lever 14 by the pilot from an inactive stand-by position to an activate operative position (i.e., in the event that an emergency landing gear free-fall deployment is required) will simultaneously and responsively activate the hydraulic control system H on the one hand and the free-fall synchronizing assemblies 16-P, 16-S and 16-N one the other hand by virtue of their operative interconnection by means of the force transmission cables 18-P, 18-S, 18-N and 18-H, respectively.

Accompanying FIGS. 2-6 further illustrate the emergency aircraft landing gear deployment system 10 with particular reference to the free-fall synchronizing assembly 16-P associated with the port main landing gear assembly 10-P. It will be understood however that the description which follows is equally applicable to the free-fall synchronizing assemblies 16-S and 16-N associated with the starboard main and nose landing gear assemblies 10-S and 10-N, respectively. Similar structures as described below with reference to the assembly 16-P will likewise be present in the assemblies 16-S and 16-N associated with the starboard main and nose landing gear assemblies 10-S and 10-N, respectively. Thus, the sequence of events described below with respect to the free-fall synchronizing assembly 16-P will occur substantially simultaneously with equivalent sequences of events for the free-fall synchronizing assemblies 16-S and 16-N associated with the starboard main and nose landing gear assemblies 10-S and 10-N, respectively.

Figure 2:
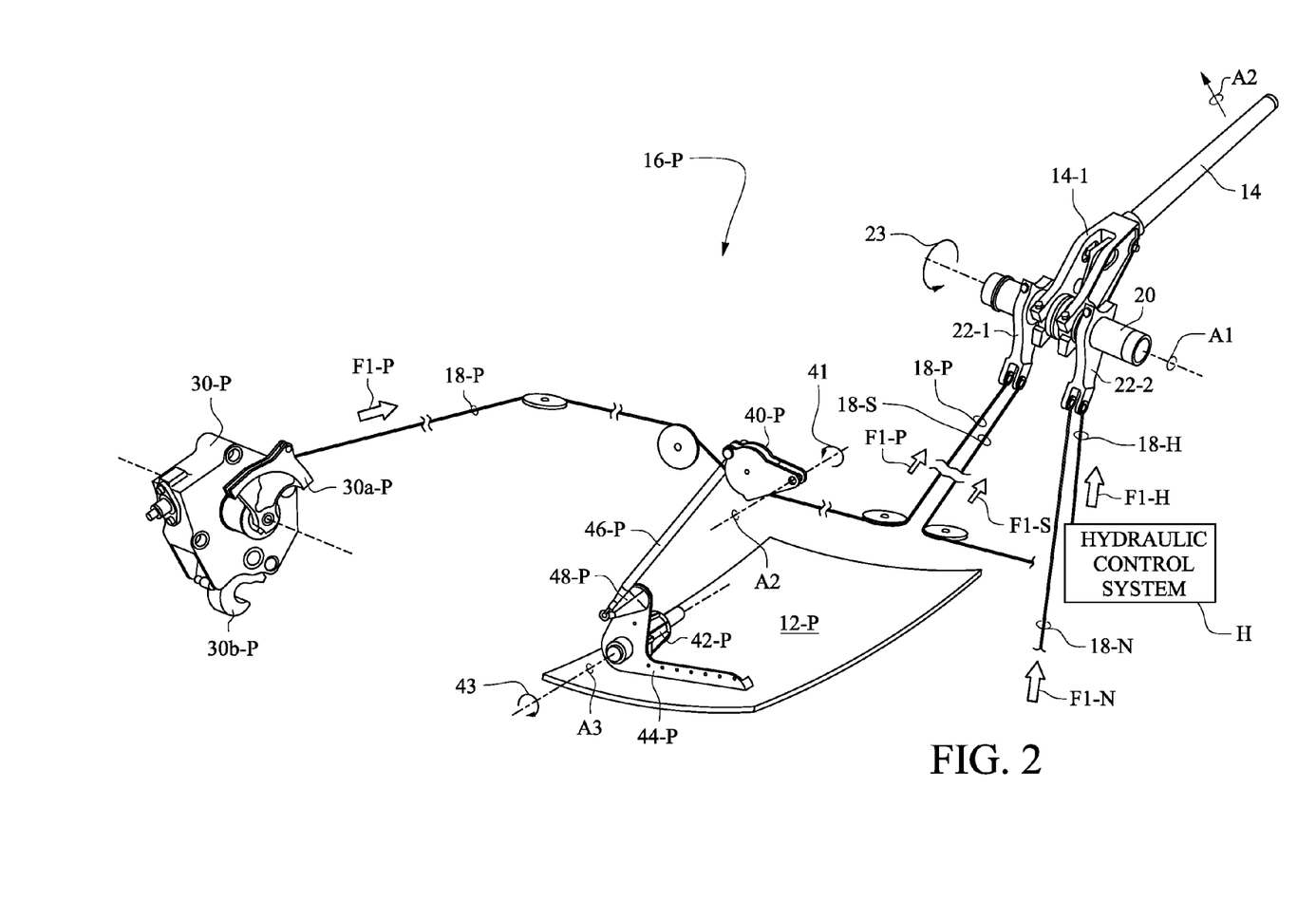
FIG. 2 is an enlarged perspective view of a part of the system shown in the embodiment of FIG. 1 associated with the left main landing gear assembly.

As may perhaps best be seen from FIG. 2, the base 14-1 of the actuating lever 14 is attached to an actuation axle 20. The axle 20 is mounted to supporting structure (not shown) for rotational movements about axis A1. The actuating axle 20 carries a cable actuator 22-1 operatively connected to a pilot-proximal end of each of the force transmission cables 18-P, 18-S associated operatively with the free-fall synchronization systems 16-P, 16-S of the port main and starboard main landing gear assemblies 10-P, 10-S, respectively. In addition, the actuation axle 20 also carries a cable actuator 22-2 connected to the pilot-proximal ends of the force transmission cables 18-N and 18-H operatively associated with the free-fall synchronization system 16-N of nose landing gear assembly 16-N and the hydraulic control system H for each of the landing gear assemblies 10-P, 10-S and 10-N, respectively. Manual pilot-initiated movement of the actuation lever 14 will thus rotate the actuating axle 20 in a counterclockwise direction (as viewed in FIG. 2) as noted by arrow 23 thereby in turn moving the cable actuators 22-1, 22-2 in the same direction so as to create retraction forces on the cables 18-P, 18-S, 18-N and 18-H in a direction of force arrows F1-P, F1-S, F1-N and F1-H. In such a manner, therefore, simultaneous actuation of the hydraulic control system H on the one hand and the free-fall synchronizing assemblies 16-P, 16-S and 16-N of the port and starboard main landing gear assemblies 10-P, 10-S, respectively, and the nose landing gear assembly 10-N will occur.

With reference specifically to the free-fall synchronizing assembly 16-P associated with the port main landing gear assembly 10-P, this initial force in the direction of arrow F1-P will be experienced by the gear uplock mechanism 30-P. Specifically, a distal end of the cable 18-P is operatively connected to an actuation member 30a-P associated with the uplock mechanism 30-P. As is shown in greater detail in FIG. 5, the force F1-P occasioned by the pivotal operation of lever 14 will in turn cause the actuation member 30a-P of the gear uplock mechanism 30-P to be pivotally rotated so as to be within a range of a pre-set timing deadstroke range α1 in which physical interconnection between the uplock hook 30b-P of the landing gear uplock mechanism 30-P and the landing gear assembly 10-P is maintained (i.e., thereby precluding the gravity free-fall of the landing gear assembly 10-P). At this moment in the initial or first operational sequence therefore the initial actuation force in the direction of arrow F1-P will not cause the uplock mechanism 30-P to physically unlock the port main landing gear assembly 10-P. Such a state is depicted by the solid line representations of the actuation member 30a-P and the uplock hook 30b-P in FIG. 5.

Figure 6:
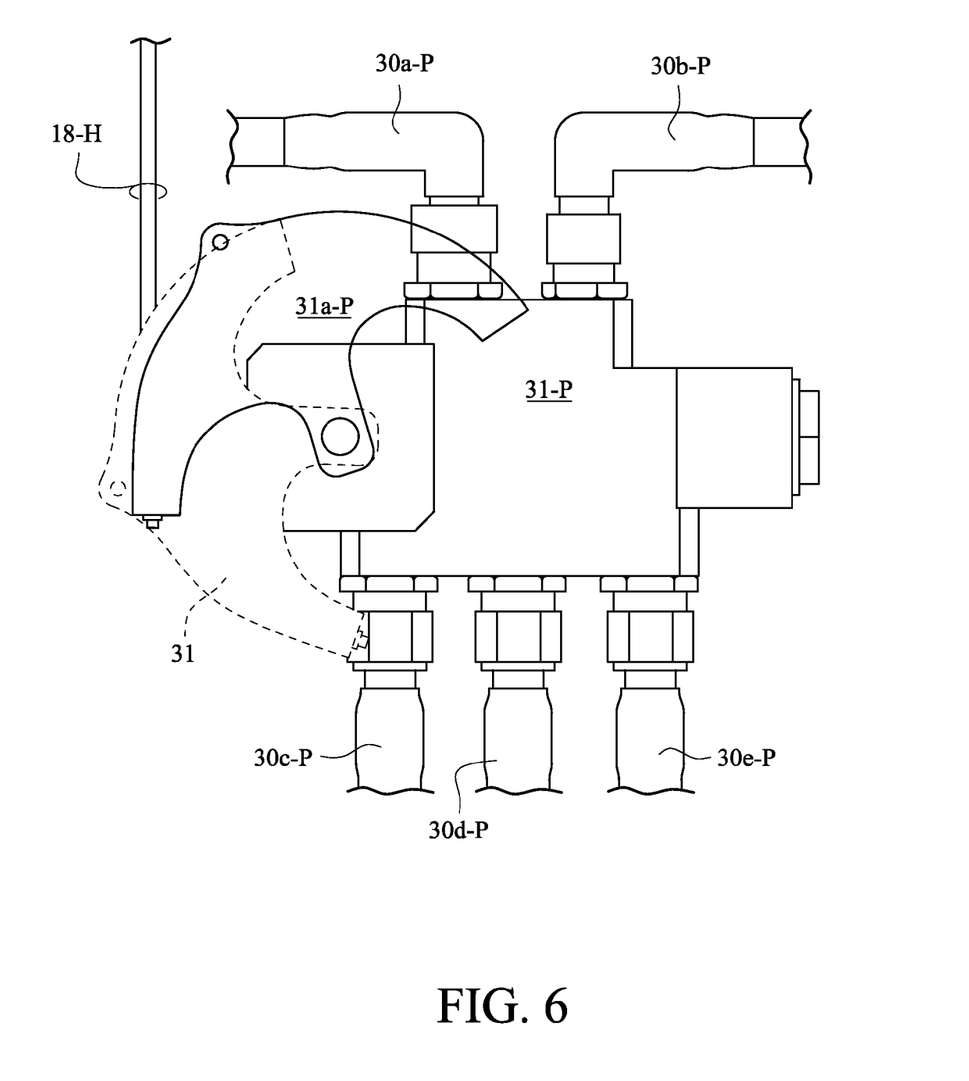
FIG. 6 is an enlarged schematic side elevational view of a hydraulic control valve associated with a landing gear assembly operatively connected to the emergency gear deployment system according to the embodiments described herein.

As shown in FIG. 6, the initial actuation force in the direction of arrow F1-H will be of sufficient magnitude to operate simultaneously the free-fall hydraulic valve 31-P for the main landing gear assembly 10-P associated with the hydraulic control system H to allow for the free-fall of the landing gear assemblies 10-P. That is, upon actuation of the lever 14, the resulting force F1-H will pivotally rotate the valve actuator 31a-P from its normal inoperative position shown by dashed line in FIG. 6 and into an operative position as shown by solid line in FIG. 6. Thus, the state of the free-fall hydraulic valve 31-P is depicted in FIG. 6 as being immediate following operation of the emergency lever 14.

Figure 3:
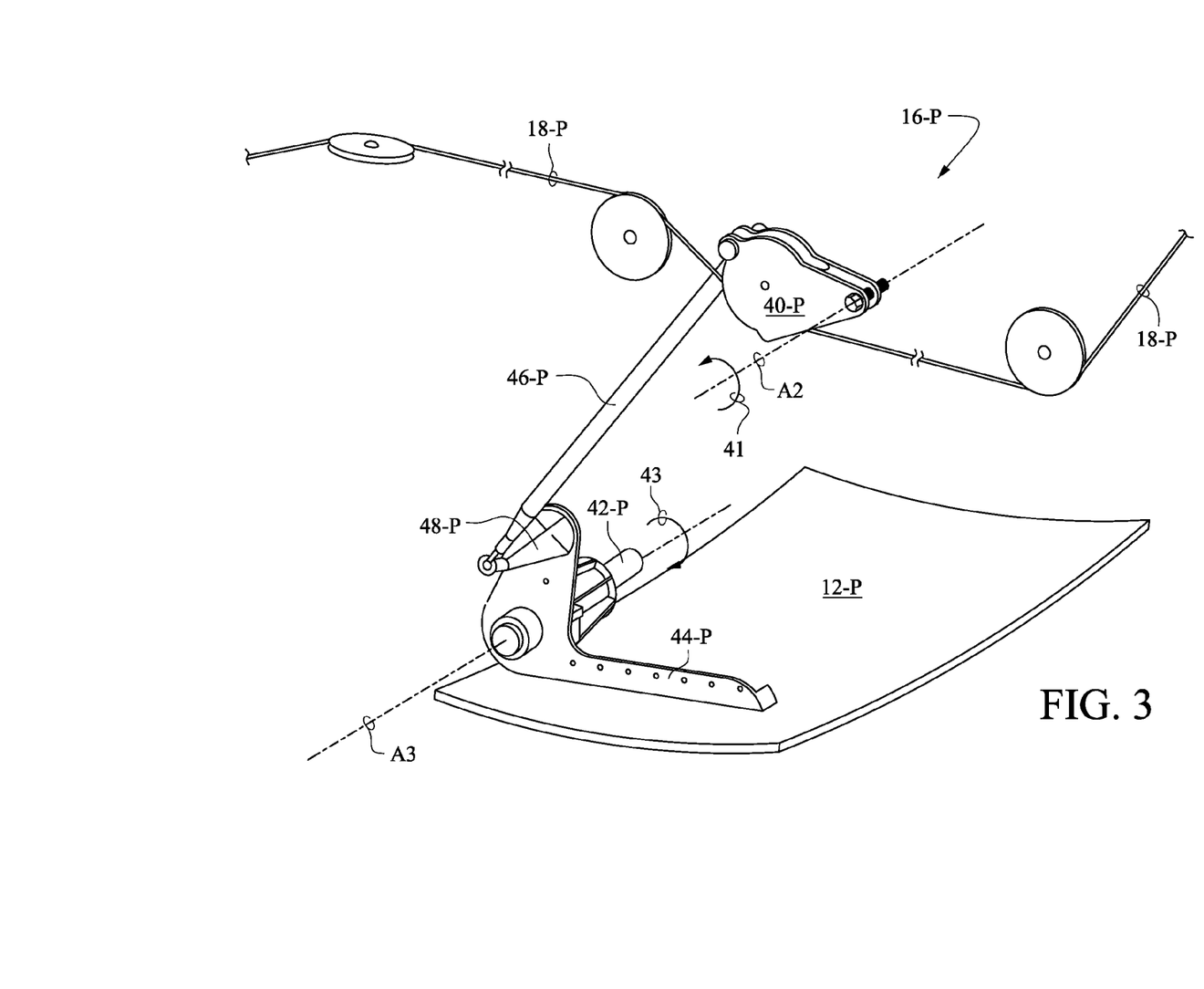
FIG. 3 is a further enlarged perspective view of the left main landing gear door and its associated system components shown with the landing gear door in a closed condition (i.e., prior to actuation of the emergency deployment system)
Figure 4:
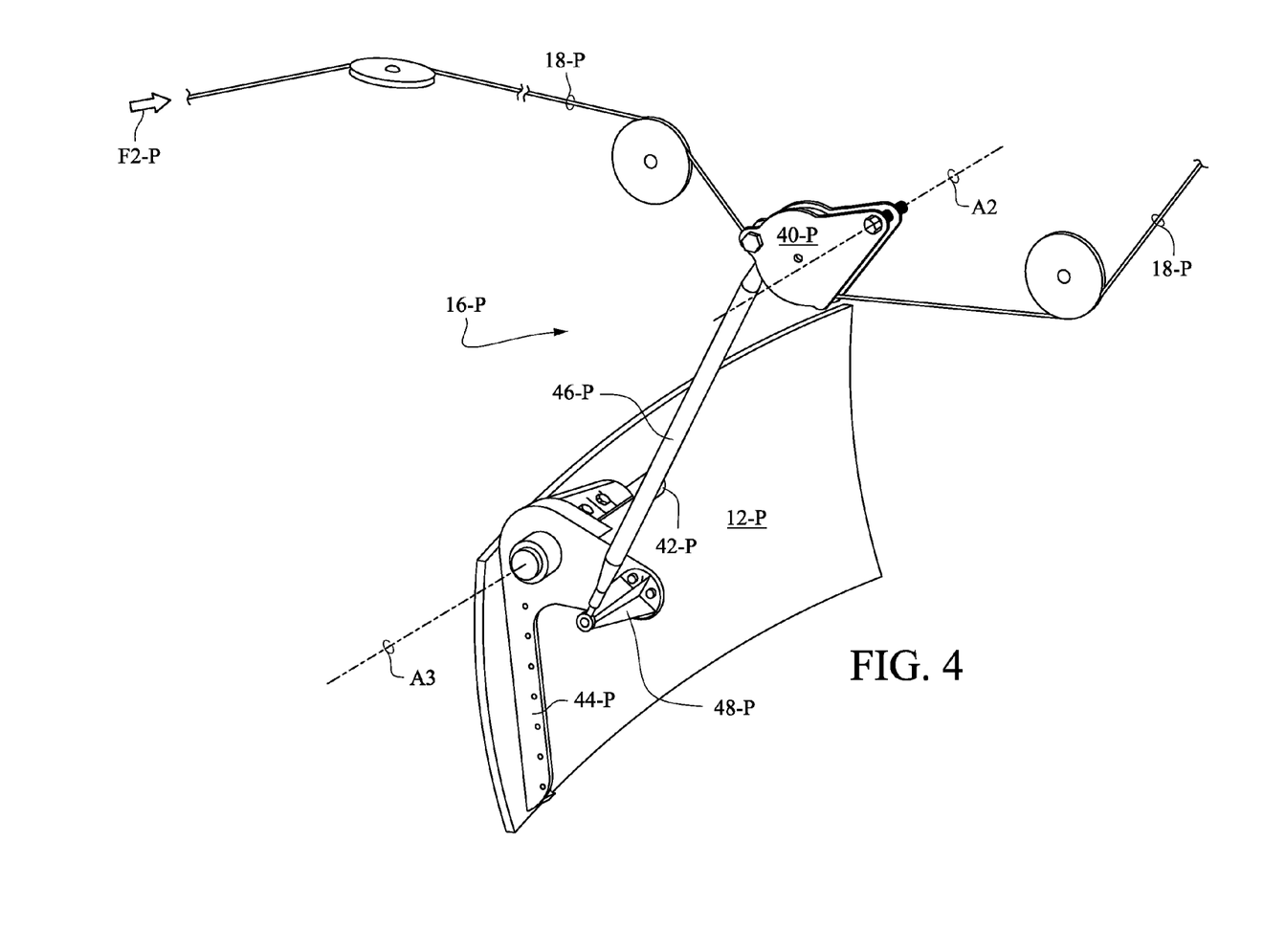
FIG. 4 is an enlarged perspective view of the left main landing gear door and its associated system components as depicted in FIG. 3 but shown with the landing gear door in an opened condition (i.e., after actuation of the emergency deployment system)
Figure 5:
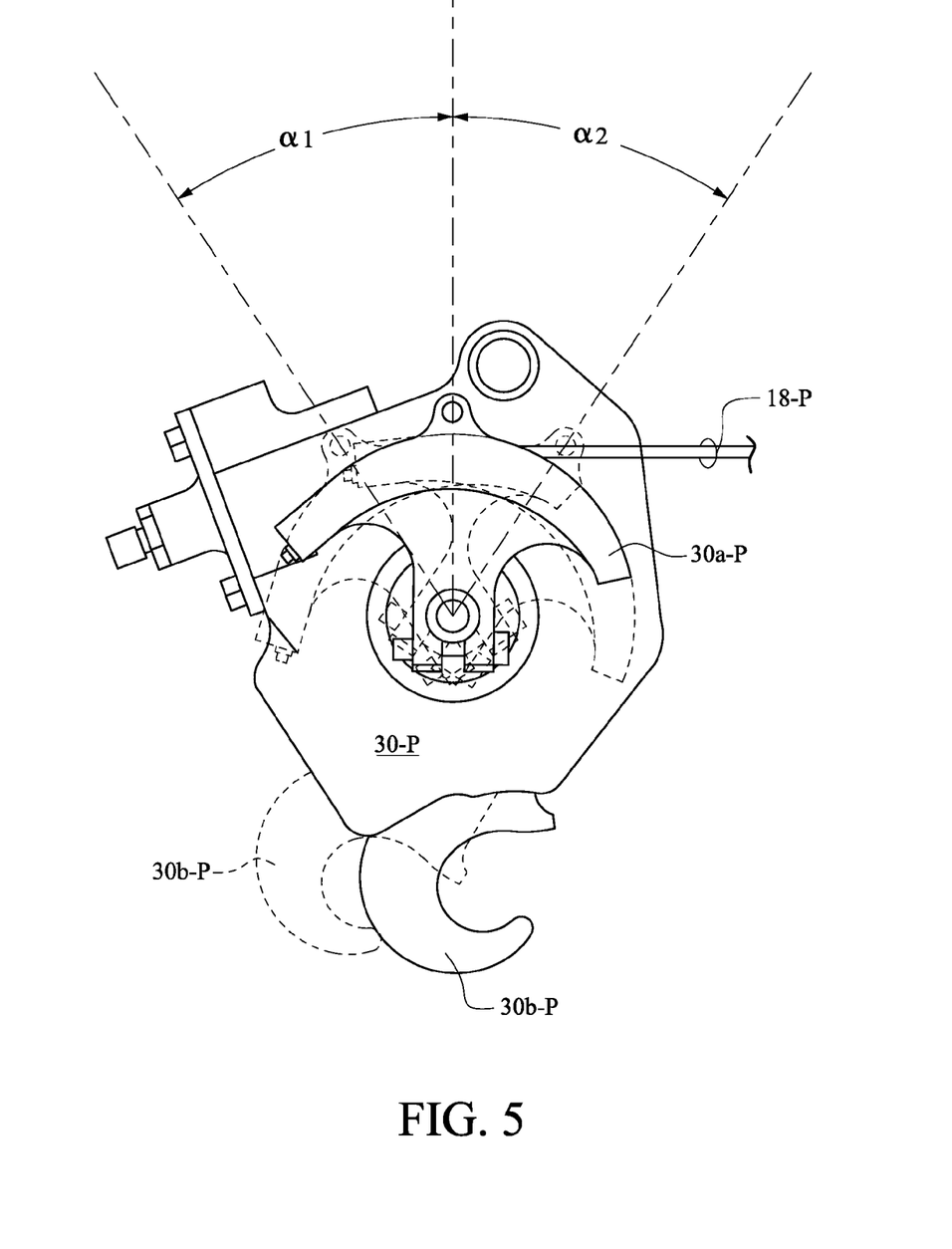
FIG. 5 is an enlarged schematic side elevational view of a landing gear uplock mechanism and its associated uplock actuator during a sequence of operation during actuation of the emergency gear deployment system according to the embodiments described herein.

When operated, therefore, the hydraulic control valve 31-P associated with the hydraulic control system H will cause the hydraulic pressure to be released simultaneously from the gear door uplock mechanism (not shown) and the gear assembly uplock mechanism 30-P by virtue of the conduits 30a-P through 30e-P. As such, the gravity free-fall of gear door 12-P will then be allowed to occur from the closed position as shown in FIG. 3 to an opened position as shown in FIG. 4. At the same time, however, the hydraulic pressure is removed from the main and nose landing gear assembly 10-P to allow for free-fall once its respective hook 30b-P associated with the uplock mechanism 30-P has been released by the free-fall synchronization system 16-P in the manner to be described below. However, at this initial stage in the sequence, even though the main landing gear door 12-P is in a gravity free-fall towards it opened position, the port main landing gear assembly 10-P will be delayed from free-fall since its uplock hook 30a-P of the associated uplock mechanism 30-P having not been released. Thus, even though the port main landing gear assembly 10-P is in a state whereby gravity free-fall may occur, the landing gear assembly 10-P is momentarily maintained in the retracted position by virtue of its engagement with the uplock hook 30a-P of the mechanism 30-P until further activation in a second sequence by the system 16-P.

FIGS. 3 and 4 further show the operational sequence of the free-fall synchronization system 16-P associated with the port main landing gear assembly 10-P. In this regard, it will be observed that the system 16-P includes a cam actuator 40-P which is pivotally connected to aircraft supporting structure (not shown) for pivotal movement about axis A2 in the direction of arrow 41. The port main landing gear door 12-P is itself mounted for pivotal movement between a closed position as shown in FIG. 3 and an opened position as shown in FIG. 4 about axis A3 in the direction of arrow 43 by means of a door hinge 42-P connected to a bracket member 44-P associated with the gear door 12-P. A linkage rod 46-P is pivotally connected at one end to the cam actuator 40-P and at the other end to a connection arm 48-P of the door bracket 44-P.

Gravity free-fall of the gear door 12-P initiated in the manner described previously will thus cause the cam actuator 40-P to rotate about axis A2 in the direction of arrow 41 by virtue of its interconnection with the gear door bracket 44-P by the linkage rod 46-P so as to move from the inoperative position as shown in FIG. 3 into an operative position as shown by FIG. 4. Such rotational movement of the cam actuator 40-P will thereby initiate the second operational sequence whereby an additional force is exerted by the cam actuator 40-P onto the cable 18-P in the direction of arrow F2-P. This additional force in the direction of arrow F2-P will then responsively cause the uplock actuator 30a-P to be further rotated by an angle α2 beyond the limit of the deadstroke range α1 (see FIG. 5) thereby disengaging the uplock hook 30b-P of the uplock mechanism 30-P from the port main landing gear assembly 10-P. At this instance, therefore, the port main landing gear assembly 10-P is then permitted to gravity free-fall from its retracted position and into its extended position (i.e., since such free-fall was previously permitted earlier in the first sequence by operation of the free-fall hydraulic valve 31-P associated with the hydraulic control system H).

It will be appreciated that the timing deadstroke in the range of α1 associated with the landing gear uplock mechanism 30-P can be adjustably pre-set so as to allow a meaningful time delay between the instant that the hydraulic pressure exerted onto the uplock mechanism 30-P is removed by actuation of the hydraulic control valve 31-P associated with the hydraulic control system H in response to the manual movement of the actuator lever 14 (i.e., during the first operational sequence) and the instant of physical release of the port main landing gear assembly 10-P by the uplock hook 30b-P of the uplock mechanism 30-P (i.e., during the second operational sequence). Such adjustment may be achieved by adjustable movement of the actuation member 30a-P and/or by means of lost motion systems (e.g., a travelling pulley associated with the cable 18-P. This adjustable time delay of the gear uplock 30-P release will therefore enable the gear door 12-P to be moved by gravity free-fall into its opened position (or at least towards the opened position sufficiently in advance of the gravity free-fall of the landing gear assembly 10-P) to prevent entirely jamming of the gear assembly 10-P by the door 12-P should physical contact occur therebetween during the emergency gear deployment cycle.

As noted previously, similar simultaneous operational sequences will occur with the starboard main and nose landing gear assemblies 10-S and 10-N upon operational movement of the actuation lever 14. Thus, similar structure and associated sequencing will be provided for each of the assemblies 10-S and 10-N so as to allow free-fall deployment thereof upon actuation of the lever 14.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An emergency gravity free-fall landing gear deployment system for aircraft comprising:
   a landing gear assembly moveable between retracted and extended positions;
   a landing gear door having a closed condition when the landing gear assembly is in the retracted position and movable into an opened condition to allow the landing gear assembly to be moved into the extended position;
   a landing gear uplock mechanism which includes an uplock actuator having a preset deadstroke limit such that movement of the uplock actuator within a range of the deadstroke prevents the landing gear uplock mechanism from physically unlocking the landing gear assembly and movement of the uplock actuator beyond the deadstroke limit unlocks the landing gear uplock mechanism from the landing gear assembly; and
   a free-fall landing gear synchronization system operatively connected to the landing gear uplock mechanism and the landing gear door, wherein the free-fall landing gear synchronization system includes:
      (i) a first operational sequence upon actuation of the free-fall landing gear synchronization system during which the uplock actuator is moved within the deadstroke range while simultaneously the gear door is allowed to gravity free-fall from the closed condition toward the open condition thereof, and
      (ii) a second operational sequence which is time-delayed relative to an onset of the first operational sequence during which the uplock actuator is moved beyond the deadstroke limit to allow the landing gear assembly to gravity free-fall from the retracted position to the extended position thereof, whereby
   the first and second operational sequences of the free-fall landing gear synchronization system allow the gear door to be moved by gravity free-fall toward the open condition thereof in advance of movement by gravity free-fall of the landing gear toward the extended position thereof.

2. The landing gear deployment system of claim 1, wherein the free-fall landing gear synchronization system comprises:
   a pilot-initiated system actuator; and
   a force-transmission cable assembly operatively interconnecting the system actuator and the uplock actuator, wherein
   operation of the system actuator initiates the first operational sequence of the free-fall landing gear synchronization system.

3. The landing gear deployment system of claim 2, which further comprises:
   a hydraulic control system operable to permit gravity free-fall of the landing gear assembly and the landing gear door, wherein
   the force-transmission cable assembly further operatively interconnects the system actuator and the hydraulic control system such that operation of the system actuator hydraulically disconnects the hydraulic control system with the landing gear assembly and the landing gear door to permit gravity free-fall thereof.

4. The landing gear deployment system of claim 2, wherein the free-fall landing gear synchronization system further comprises:
   a cam actuator operatively interacting with the force transmission cable assembly and moveable between an inoperative state and an operative state; and
   a linkage rod interconnecting the cam actuator and the landing gear door to cause the cam actuator to move respectively from the inoperative state to the operative state thereof in response to movement of the landing gear door from a closed condition to an open condition thereof, wherein
   movement of the cam actuator to the operative position thereof initiates the second operational sequence of the free-fall landing gear synchronization system.

5. The landing gear deployment system of claim 4, wherein the system actuator is a manually operable lever.

6. The landing gear deployment system of claim 5, wherein the manually operable lever comprises:
   a lever handle;
   a rotatable actuator rod;
   a mounting base for mounting the lever handle to the actuator rod; and
   a cable actuator carried by the actuator rod and connected to a proximal end of the cable assembly.

7. An aircraft which comprises an emergency gravity free-fall landing gear deployment system as in claim 1.

8. An emergency gravity free-fall landing gear deployment system comprising a free-fall landing gear synchronization system providing time-delayed gravity free-fall of an aircraft landing gear assembly relative to gravity free-fall of a landing gear door associated with the landing gear assembly, wherein the free-fall landing gear synchronization system includes:
   (a) a pilot-initiated system actuator;
   (b) a force transmission cable assembly having one end connected to the system actuator and an opposite end connected to an uplock actuator operatively associated with a landing gear uplock mechanism of the landing gear assembly;
   (c) a cam actuator operatively interacting with the force transmission cable assembly and pivotally moveable between an inoperative state and an operative state; and
   (d) a linkage rod interconnecting the cam actuator and the landing gear door to cause the cam actuator to move respectively from the inoperative state to the operative state thereof in response to movement of the landing gear door from a closed condition to an open condition thereof, and
   (e) a time-delay system having a first operational sequence which allows for the gear door to gravity free-fall into an opened position and a second operational sequence which is time-delayed from onset of the first operational sequence to allow gravity free-fall of the landing gear assembly, the time-delay system comprising an uplock actuator having a deadstroke range,
      wherein during said first operational sequence the uplock actuator is moved within the deadstroke range while simultaneously the gear door is allowed to gravity free-fall from the closed condition toward the open condition thereof, and during said second operational sequence the uplock actuator is moved beyond the deadstroke range to allow the landing gear assembly to gravity free-fall from the retracted position to the extended position.

9. The landing gear deployment system of claim 8, wherein the time-delay system comprises:

a hydraulic control system which allows the landing gear door to gravity free-fall from the closed condition toward the open condition thereof during the first operational sequence, and wherein the first operational sequence allows the uplock actuator to move within the deadstroke range and the uplock mechanism remains physically connected to the landing gear assembly, the second operational sequence is initiated by the cam actuator being pivotally moved in response to the gravity free-fall of the landing gear door toward the open position thereof so as to exert a force onto the transmission cable thereby responsively moving the uplock actuator beyond a limit of the deadstroke range thereby physically disconnecting the uplock mechanism with the landing gear assembly to permit gravity free-fall of the landing gear assembly toward the extended position thereof, whereby the gravity free-fall of the landing gear assembly toward the extended position thereof is time-delayed relative to the gravity free-fall of the landing gear door toward the open condition thereof.

10. The landing gear deployment system of claim 9, wherein the hydraulic control system comprises a hydraulic control valve, and wherein the force-transmission cable assembly further operatively interconnects the system actuator and the hydraulic control valve such that operation of the system actuator hydraulically disconnects the hydraulic control system with the landing gear assembly and the landing gear door to permit gravity free-fall thereof.

11. The landing gear deployment system of claim 8, wherein the system actuator is a manually operable lever.

12. The landing gear deployment system of claim 11, wherein the manually operable lever comprises:

a lever handle;

a rotatable actuator rod;

a mounting base for mounting the lever handle to the actuator rod; and a cable actuator carried by the actuator rod and connected to a proximal end of the cable assembly.

13. An aircraft which comprises an emergency gravity free-fall landing gear deployment system as in claim 8.

* * * * *